United States Patent
Ogawa

(10) Patent No.: US 7,187,872 B2
(45) Date of Patent: Mar. 6, 2007

(54) BROADBAND PULSE WIDTH MODULATION CIRCUIT AND OPTICAL AMPLIFIER USING THE SAME

(75) Inventor: Kazuhito Ogawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 542 days.

(21) Appl. No.: 10/836,233

(22) Filed: May 3, 2004

(65) Prior Publication Data

US 2005/0152703 A1 Jul. 14, 2005

(30) Foreign Application Priority Data

Jan. 9, 2004 (JP) .............................. 2004-004271

(51) Int. Cl.
*H04B 10/02* (2006.01)

(52) U.S. Cl. ...................... 398/193; 398/189

(58) Field of Classification Search ............... 398/183, 398/189–193; 375/238, 239
See application file for complete search history.

(56) References Cited

U.S. PATENT DOCUMENTS 5,448,629 A * 9/1995 Bosch et al. ................. 398/191
6,330,279 B1 * 12/2001 Belser et al. ................. 375/238

FOREIGN PATENT DOCUMENTS

JP HEI 5-333953 12/1993
JP HEI 7-326055 12/1995

* cited by examiner

*Primary Examiner*—Dalzid Singh
(74) *Attorney, Agent, or Firm*—Staas & Halsey LLP

(57) ABSTRACT

A broadband pulse width modulation circuit is provided which can achieve high speed responsibility while assuring an advantage of a pulse width modulation (PWM) circuit having a good power efficiency in order to satisfy a demand for reduction of power consumption and a demand for high speed responsibility in the field of optical communication. The broadband PWM circuit includes a PWM circuit for modulating and smoothing a pulse width in response to an input voltage signal to supply electric current to a load, a frequency band selection and amplification circuit for selectively amplifying only a specific frequency band of the input voltage signal, and a composition circuit for combining electric current from the pulse width modulation circuit and the electric current amplified by the frequency band selection and amplification circuit.

24 Claims, 8 Drawing Sheets

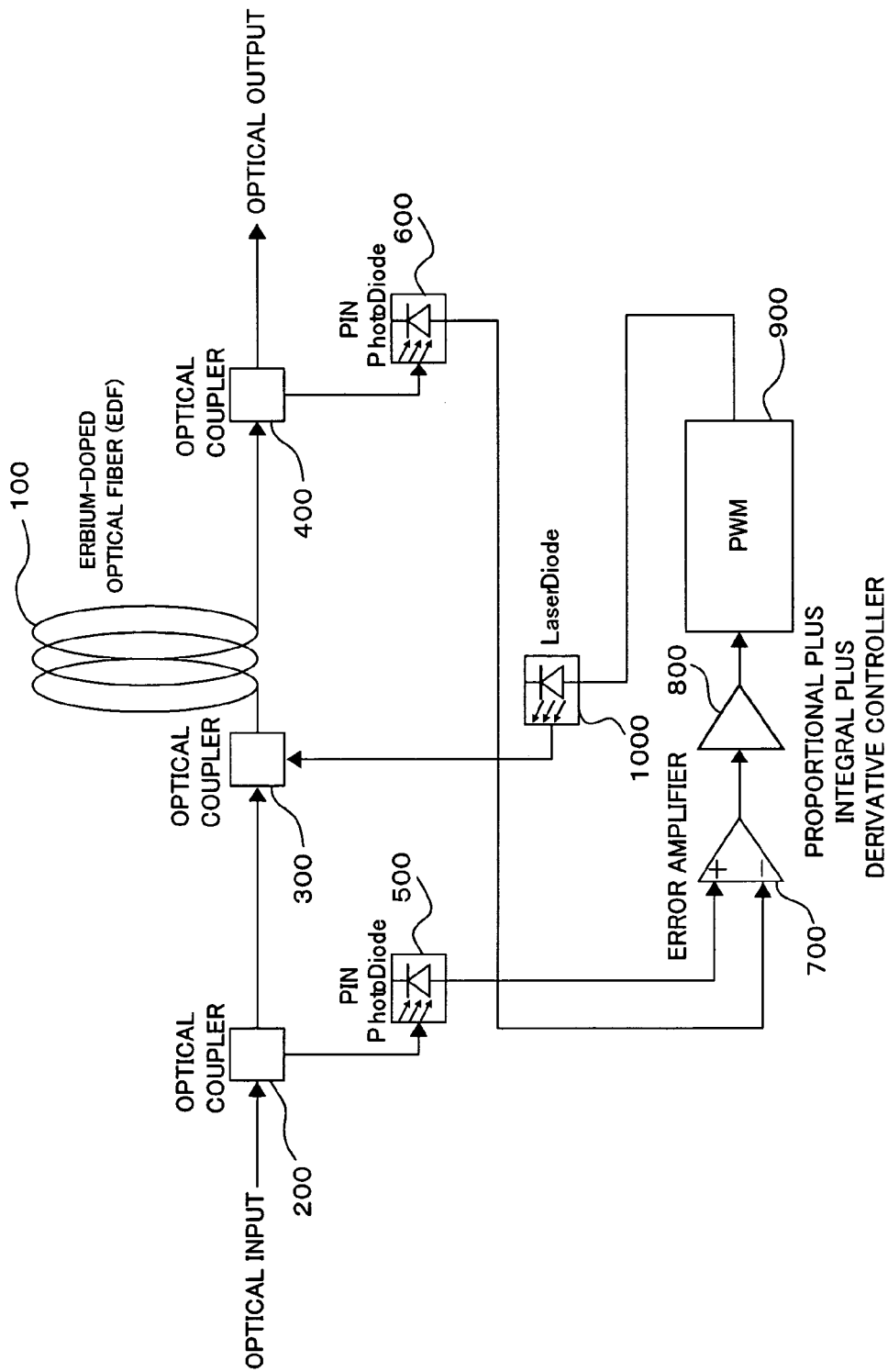

BROADBAND PULSE WIDTH MODULATION CIRCUIT AND OPTICAL AMPLIFIER USING THE SAME

BACKGROUND OF THE INVENTION

1) Field of the Invention

The present invention relates to a broadband pulse width modulation circuit suitable for use with a constant current driving source which utilizes a pulse width modulation technique used, for example, for an optical amplifier, an optical communication apparatus and so forth and an optical amplifier using the broadband pulse width modulation circuit.

2) Description of the Related Art

FIG. 8 is a block diagram showing a configuration of an existing optical amplifier. The optical amplifier shown in FIG. 8 branches part of input and output light of, for example, an erbium-doped optical fiber (EDF) 100 as monitor light by means of optical couplers 200 and 400 and supplies the branched light to light reception devices 500 and 600 such as PIN photodiodes, respectively. Then, the optical amplifier monitors the levels of the input and output lights of the EDF 100 to detect an error therebetween by means of an error amplifier 700, and performs proportional plus integral plus derivative (PID) control of an output (excitation light power) of an excitation light laser 1000 such as semiconductor laser by means of a PID controller 800 so that a predetermined amplification gain is obtained based on a result of the detection. It is to be noted that the excitation light is supplied to the EDF 100 by an optical coupler 300 provided on the input side of the EDF 100.

Here, in order to drive the excitation light laser 1000, generally high current (several hundred mA or more) is required, and therefore, reduction of the power consumption is demanded. To this end, it has been proposed to use a pulse width modulation circuit (PWM circuit) 900 in which a field effect transistor (FET) or a bipolar transistor is used as a switching device as a circuit technique for reducing the power consumption. The PWM circuit is utilized also in order to reduce the power consumption of components used in an optical communication apparatus and requiring high current such as a semiconductor laser, an electronic cooling device, an electric heater and so forth.

It is to be noted that a technique which uses a PWM circuit is disclosed, for example, in Japanese Patent Laid-Open No. HEI 5-333953 (hereinafter referred to as Patent Document 1) or Japanese Patent Laid-Open No. HEI 7-326055 (hereinafter referred to as Patent Document 2).

The technique disclosed in Patent Document 1 is applied to a static reactive power compensation apparatus incorporated in an electric system, to which a fluctuating load is applied such as that of an electric vehicle to suppress the fluctuation of a system voltage. In the static reactive power compensation apparatus, when an instantaneous voltage drop is caused by closing of an AT feeder or changeover closing of an electric car, PWM high-speed response control is suitably applied in response to CB commission information in order to reduce the total driving loss upon inverter driving. To this end, a PWM carrier frequency changeover circuit is provided to a PWM gate control circuit for the inverter so that a PWM carrier frequency can be changed over. Thus, with the static reactive power compensation apparatus, during steady operation, a rectangular wave is outputted to reduce the switching loss, and only a voltage fluctuation caused by rush current upon transient response (such as changeover closing of an electric car) is controlled at a high speed by the PWM control to suppress an instantaneous drop of the voltage. Further, when the steady state is restored, the rectangular wave output is restored to reduce the switching loss. Accordingly, by suppressing the transient voltage fluctuation and besides reducing the total driving loss, inverter driving can be performed with a high efficiency.

On the other hand, the technique disclosed in Patent Document 2 is directed to a method of controlling a laser writing output level in an optical disk recording apparatus applied to a data recording apparatus for a write-once-read-many optical disk for automatically calibrating a laser using a writing pulse focused on the disk during write data operation. Also use of a PWM signal for a testing signal of a writing pulse for data recording is disclosed in Patent Document 2.

However, where the PWM circuit 900 is used to control the excitation light laser 1000 of the optical amplifier as described above with reference to FIG. 8, a PWM output pulse must be smoothed and a coil (L) and a capacitor (C) for smoothing must be required. Therefore, there is a defect that a signal frequency band is limited by the time constant of the LC elements. In recent years, for an optical communication apparatus, particularly in optical amplifiers, high speed responsibility is required. However, where a PWM circuit which requires a smoothing circuit having LC elements in this manner is used, since a signal frequency band is limited significantly, there is a subject that satisfaction of the requirement for a high speed response is not easy. Further, even if any one of the techniques disclosed in Patent Documents 1 and 2 is applied, the subject just described is not solved.

SUMMARY OF THE INVENTION

It is an object of the present invention to provide a broadband pulse width modulation circuit and an optical amplifier incorporating the same which have a desired signal band characteristic and can achieve high speed responsibility while assuring an advantage of a PWM circuit having a good power efficiency in order to satisfy a demand for reduction of power consumption and a demand for high speed responsibility in the field of optical communication.

In order to attain the object described above, according to an aspect of the present invention, there is provided a broadband pulse width modulation circuit, comprising a pulse width modulation circuit for modulating and smoothing a pulse width in response to an input voltage signal and supplying resulting electric current to a load, a frequency band selection and amplification circuit for selectively amplifying only a specific frequency band of the input voltage signal, and a composition circuit for combining the electric current from the pulse width modulation circuit and the amplified electric current from the frequency band selection and amplification circuit.

According to another aspect of the present invention, there is provided a broadband pulse width modulation circuit, comprising a pulse width modulation circuit for modulating and smoothing a pulse width in response to an input voltage signal and supplying resulting electric current to a load, a frequency band selection and amplification circuit for selectively amplifying only a specific frequency band of the input voltage signal, a current boosting circuit for amplifying output current of the frequency band selection and amplification circuit, and a composition circuit for combining the electric current from the pulse width modulation circuit and the output current from the current boosting circuit.

In both of the broadband pulse width modulation circuits, the load may be formed from a semiconductor laser.

Preferably, the composition circuit is formed from a capacitor which blocks a direct current signal.

The frequency band selection and amplification circuit may include a high-pass filter for passing therethrough frequencies of a higher frequency band than a maximum frequency with which a frequency band characteristic of the pulse width modulation circuit degrades, an amplifier for amplifying an output of the high-pass filter to perform scale adjustment so that a passing band characteristic of the specific frequency band may become flat, and a low-pass filter for passing therethrough only frequency components which form the specific frequency band from within an output of the amplifier.

According to a further aspect of the present invention, there is provided an optical amplifier, comprising a semiconductor laser, an optical amplification medium for amplifying an input optical signal using an output of the semiconductor laser as excitation light, an error detection section for detecting a level error between an input and an output of the optical amplification medium, and a broadband pulse modulation circuit including a pulse width modulation circuit for modulating and smoothing, using an error detection signal from the error detection section as an input voltage signal, a pulse width in response to the input voltage signal and supplying resulting driving current to the semiconductor laser, a frequency band selection and amplification circuit for selectively amplifying only a specific frequency band of the input voltage signal, and a composition circuit for combining the driving current from the pulse width modulation circuit and the amplified electric current from the frequency band selection and amplification circuit.

According to a still further aspect of the present invention, there is provided an optical amplifier, comprising a semiconductor laser, an optical amplification medium for amplifying an input optical signal using an output of the semiconductor laser as excitation light, an error detection section for detecting a level error between an input and an output of the optical amplification medium, and a broadband pulse modulation circuit including a pulse width modulation circuit for modulating and smoothing, using an error detection signal from the error detection section as an input voltage signal, a pulse width in response to the input voltage signal and supplying resulting driving current to the semiconductor laser, a frequency band selection and amplification circuit for selectively amplifying only a specific frequency band of the input voltage signal, a current boosting circuit for amplifying output current of the frequency band selection and amplification circuit, and a composition circuit for combining the driving current from the pulse width modulation circuit and the output current from the current boosting circuit.

In both of the optical amplifiers, the composition circuit may be formed from a capacitor which blocks a direct current signal.

The frequency band selection and amplification circuit may include a high-pass filter for passing therethrough only high frequency components which form the specific frequency band of the input voltage signal, an amplifier for amplifying an output of the high-pass filter to perform scale adjustment so that a passing band characteristic of the specific frequency band may become flat, and a low-pass filter for passing therethrough only low frequency components which form the specific frequency band from within an output of the amplifier.

With the broadband pulse width modulation circuits and the optical amplifiers, not only assurance of an advantage such implementation of reduction of current consumption in a pulse width modulation circuit but also increase of a signal frequency band can be easily achieved adapting to a desired band characteristic.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 8 is a block diagram showing an example of a configuration of a conventional optical amplifier.

DESCRIPTION OF THE PREFERRED EMBODIMENT

[A] Description of an Embodiment

Figure 1:
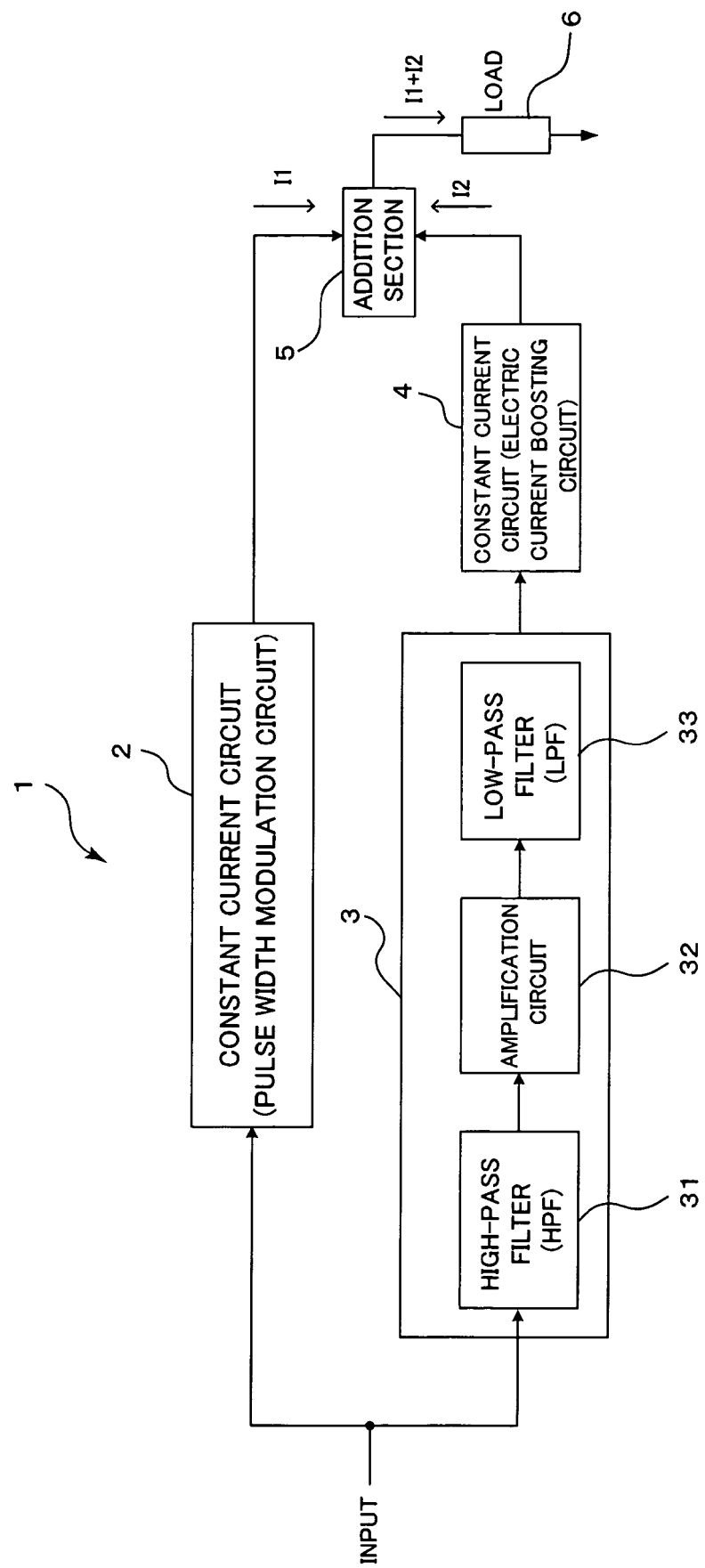
FIG. 1 is a block diagram showing a configuration of a broadband pulse width modulation (PWM) circuit as an embodiment of the present invention.

FIG. 1 is a block diagram showing a configuration of a broadband pulse width modulation (PWM) circuit as an embodiment of the present invention. The broadband PWM circuit 1 shown in FIG. 1 includes a pulse width modulation (PWM) circuit (constant current circuit) 2, a frequency band selection and amplification circuit 3, an electric current boosting circuit (constant current circuit) 4, and an addition section (composition circuit) 5. It is to be noted that reference numeral 6 denotes a load (for example, a semiconductor laser or the like) which receives and is driven with output current from the broadband PWM circuit 1.

The pulse width modulation circuit 2 performs pulse width modulation for an input signal to smooth the input signal to supply electric current (I1) to the load 6. The pulse width modulation circuit 2 has functions as, for example, a pulse width modulation section for varying the time proportion (Duty ratio) of a pulse in response to an input signal, a switching device (FET or the like) (a PWM driving section) driven with a pulse voltage having the time proportion (Duty ratio), and a PWM smoothing section (smoothing filter) for smoothing modulation current obtained from the switching device. The smoothing filter is formed from a coil (L) and a capacitor (C). Therefore, usually the pulse width modulation circuit 2 has a transmission characteristic of a primary or secondary low-pass filter (LPF).

The frequency band selection and amplification circuit 3 selectively amplifies a specific frequency band of an input voltage signal, particularly, only a frequency band necessary for expansion of the transmission characteristic (frequency characteristic) of the PWM circuit 2 itself to the high frequency band side. Here, the frequency band selection and amplification circuit 3 is formed from, for example, a high-pass filter (HPF) 31, an amplification circuit 32, and an LPF 33 and generally has a transmission characteristic of a band pass filter (BPF). It is to be noted that the HPF 31 is a filter for passing therethrough frequencies of a higher frequency band than the highest frequency with which a band characteristic of the pulse width modulation circuit 2 degrades. Meanwhile, the LPF 33 is a filter for passing therethrough only frequency components which form the specific frequency band from within an output of the amplification circuit 32 to remove unnecessary high frequencies or high frequencies to be eliminated in design of a control loop. The amplification circuit 32 is hereinafter described.

The frequency band selection and amplification circuit 3 is usually formed from an operational amplifier or the like and, in most cases, can pass only low current. Therefore, the electric current boosting circuit 4 has a function as a power amplifier for making it possible to supply high current.

The composition circuit 5 sums (combines) the current (I1) from the PWM circuit 2 and output current (I2) from the electric current boosting circuit 4.

Figure 2:
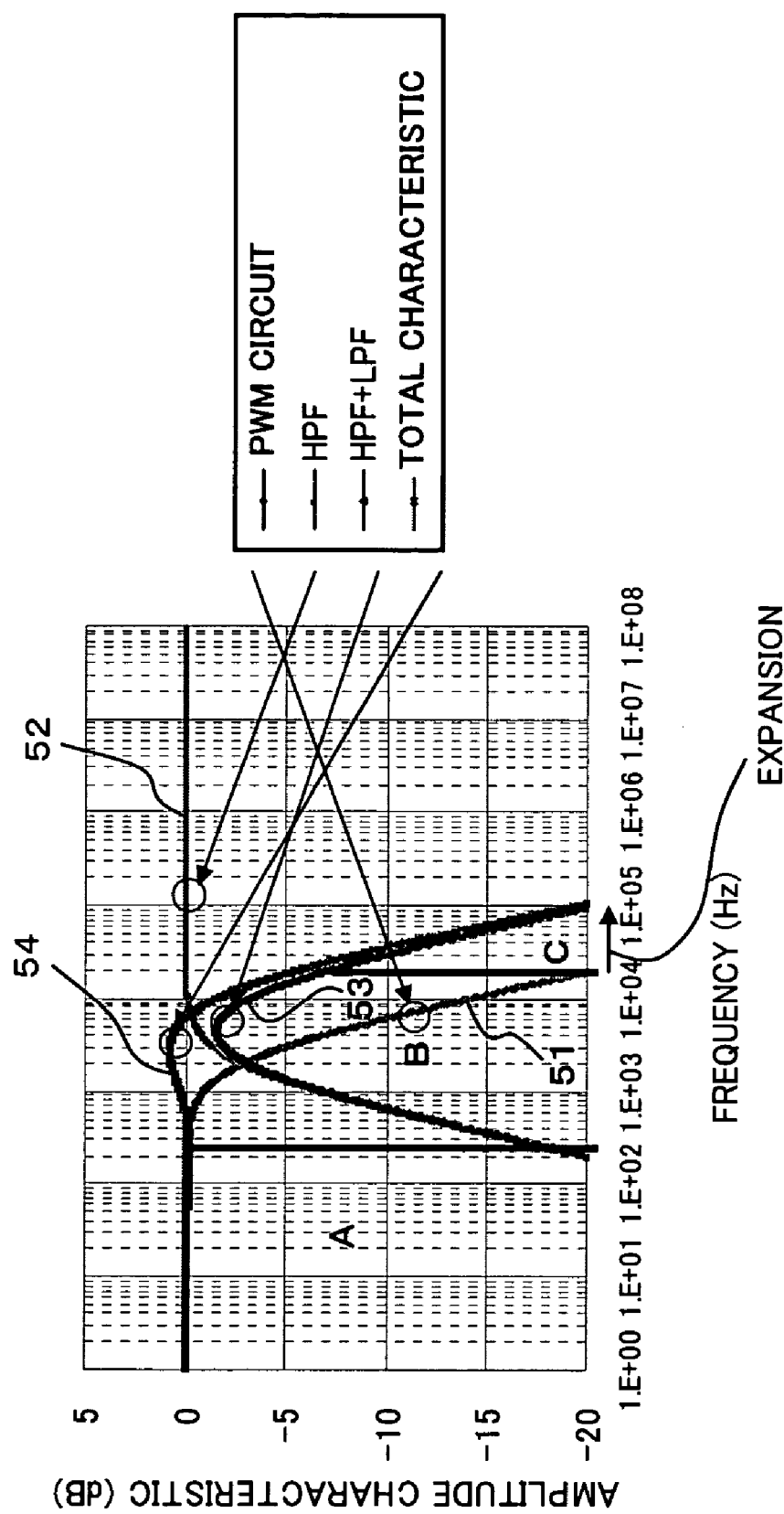
FIG. 2 is a graph showing an example of a frequency versus amplitude characteristic of the broadband pulse width modulation circuit shown in FIG. 1.

By the configuration of the circuit described above, the transmission characteristic of the pulse width modulation circuit 2 only spanning from direct current to a low frequency band can be expanded up to a high frequency band so that high speed tracking for transient variation can be implemented. Here, an example of the transmission characteristic (frequency versus amplitude characteristic) of the configuration of the circuit described above is shown in FIG. 2. In FIG. 2, as the PWM transmission characteristic, a secondary delay element as given by an expression (1) below is indicated (refer to a solid line curve 51). This indicates a simulation of a transmission characteristic where a PWM circuit wherein L=10 µH, C=22 µF, and the PWM operation frequency is 100 kHz is used as the actual PWM circuit 2.

$$G_1(S) = \frac{K_1 \omega_1^2}{s^2 + \frac{\omega_1}{Q_1} \cdot s + \omega_1^2} \quad (1)$$

where, s=jω, $K_1$=1, $\omega_1$=2π $f_1$, $f_1$=4 kHz, and $Q_1$=0.5.

Further, the transfer functions of the HPF 31 and the LPF 33 of the frequency band selection and amplification circuit 3 are given by the following expressions (2) and (3), respectively:

$$G_1(S) = \frac{K_2 \cdot s^2}{s^2 + \frac{\omega_2}{Q_2} \cdot s + \omega_2^2} \quad (2)$$

-continued
$$G_1(S) = \frac{K_3 \omega_3^2}{s^2 + \frac{\omega_3}{Q_3} \cdot s + \omega_3^2} \quad (3)$$

where, $K_2$=1, $\omega_2$=2π $f_2$, $f_2$=100 Hz, $Q_2$=0.5, $K_3$=1, $\omega_3$=2π $f_3$, $f_3$=20 kHz, and $Q_3$=0.5.

In FIG. 2, a solid line curve 52 indicates the transmission characteristic of the HPF 31, and another solid line curve 53 indicates a composite characteristic of the HPF 31 and the LPF 33.

It is to be noted that, in FIG. 2, functional effects of the amplification circuit 32 positioned at the middle stage of the frequency band selection and amplification circuit 3 and the current boosting circuit 4 are not denoted but included in the LPF 33 and the HPF 31. It can be recognized from the configuration of the circuit (refer to FIG. 1) described above that the signal frequency band characteristic (total characteristic: refer to a solid line curve 54 in FIG. 2) is effectively expanded to the high frequency band (region C).

Next, an example of a configuration of an actual electronic circuit is described.

Figure 3:
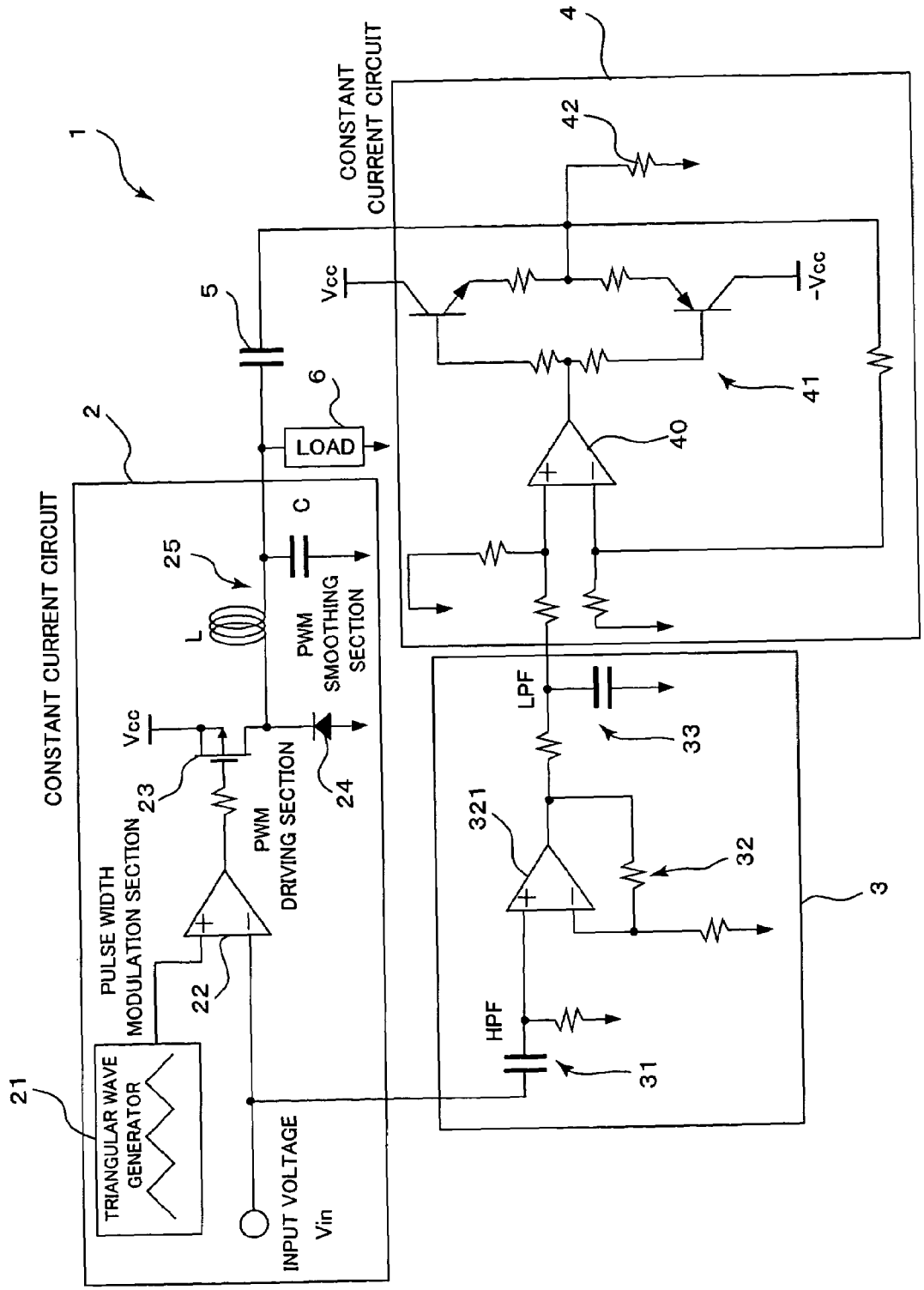
FIG. 3 is an electronic circuit diagram showing a particular example of the broadband pulse width modulation circuit shown in FIG. 1.

As shown in FIG. 3, the pulse width modulation circuit 2 includes a triangular wave generator 21 and a comparator 22 as the pulse width modulation section, a transistor (FET) 23 and a free wheel diode 24 as the PWM driving section, and a coil (L) and a capacitor (C) as the PWM smoothing section (smoothing filter) 25.

Figure 4:
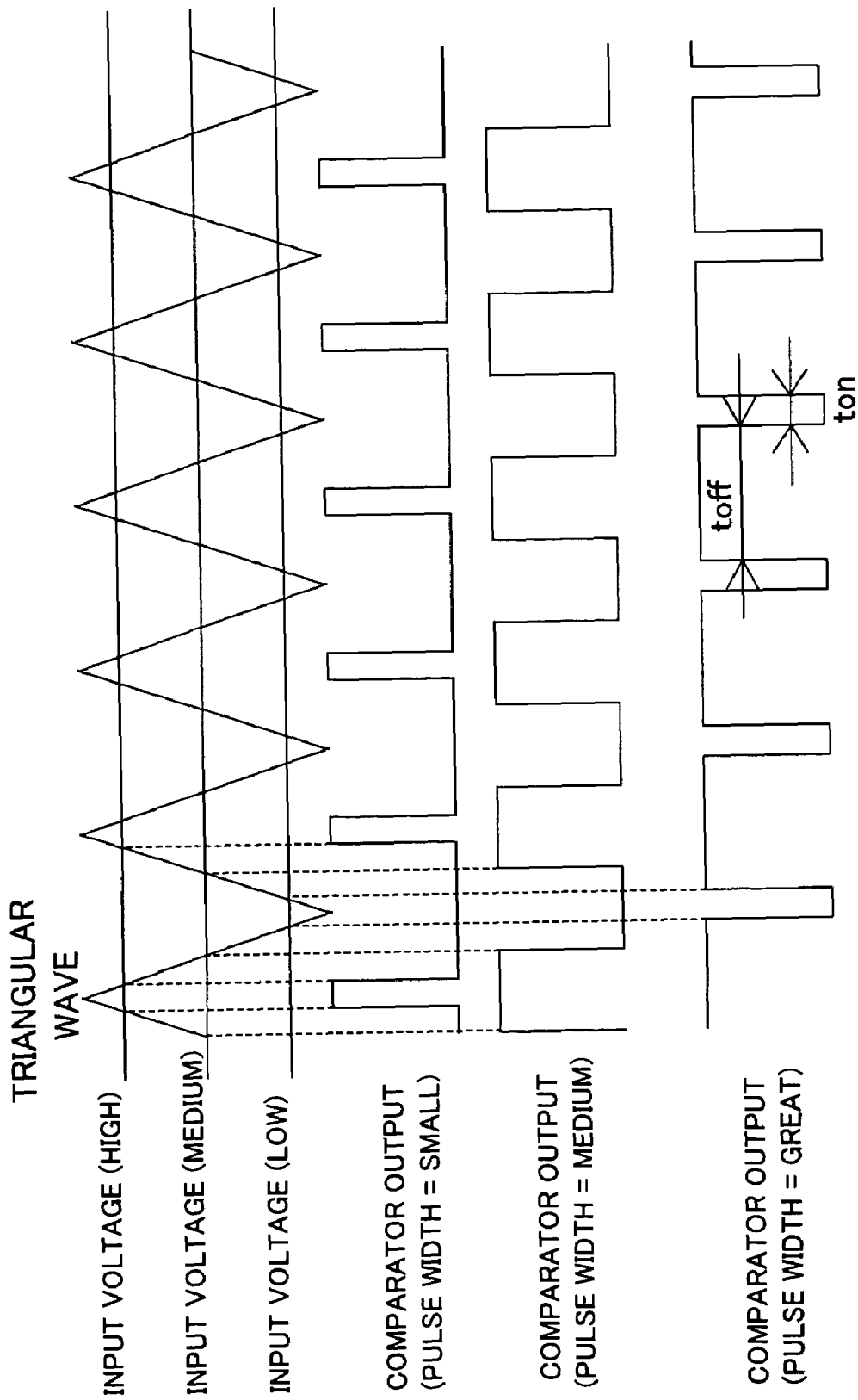
FIG. 4 is a waveform diagram illustrating pulse width modulation operation of the broadband pulse width modulation circuit shown in FIG. 1.

The triangular wave generator 21 generates a triangular wave which is a comparison object in the comparator 22. The comparator 22 compares the triangular wave and an input signal voltage (Vin) to obtain a pulse width modulation wave in accordance with the magnitude of the input signal voltage, for example, as shown in FIG. 4. It is to be noted that a definition of the time proportion (Duty ratio) in the PWM operation is given by the next expression (4):

$$\text{time proportion (Duty ratio) } D = \frac{t_{on}}{t_{on} + t_{off}} \quad (4)$$

The transistor (switching device) 23 performs switching operation in response to the pulse voltage outputted from the comparator 22 for which the pulse width modulation process has been performed. The smoothing filter 25 smoothes switching current supplied from the transistor 23. The free wheel diode 24 is provided in order to secure a reflux current path.

By the configuration described above, electric current $I_L$ supplied from the pulse width modulation circuit 2 to the load 6 is given, where a load resistance is RL, by the next expression (5):

$$I_L = D \times \frac{V_{CC}}{R_L} \quad (5)$$

The frequency band selection and amplification circuit 3 is formed from an HPF 31 formed from a capacitor and a resistor, an amplification circuit 32 for which an operational amplifier 321 is used, and an LPF 33 formed from a resistor and a capacitor.

As shown in FIG. 2, the HPF 31 passes only high frequency components (high frequency components which form the specific frequency band of the input voltage signal) attenuated by the PWM circuit 2. The amplification circuit 32 performs scale adjustment so that a pass band characteristic of the entire circuit becomes as flat as possible when the electric current from the PWM circuit 2 and the electric current from the electric current boosting circuit 4 are combined with each other by the capacitor 5 serving as the addition section 5. The LPF 33 removes unnecessary high frequency components from within the output of the amplification circuit 32 to pass only low frequency components which form the specific frequency band. Further, the LPF 33 is necessary for performing delay compensation of a control loop, for example, in a case wherein the broadband PWM circuit 1 is incorporated in an auto gain control (AGC) circuit in an optical amplifier and so forth.

The electric current boosting circuit 4 is formed from an operational amplifier 40 and a push-pull circuit 41. Normally, in most cases, the frequency band selection and amplification circuit 3 can pass only low electric current of approximately several tens mA (milliamperes) like the operation amplifier 321. Therefore, the electric current boosting circuit 4 implements, in order to compensate for the defect just described, a function of a power amplification stage which can pass electric current of approximately several A (amperes). However, if sufficient electric current (approximately several A) can be obtained by the frequency band selection and amplification circuit 3 in the preceding stage, then the electric current boosting circuit 4 may not be provided.

Here, for the connection between the electric current boosting circuit 4 and the load 6, the capacitor 5 is used so as to cut a direct current signal. If such a configuration as just described is applied, then the situation can be prevented that a direct current signal having passed through the PWM circuit 2 has an influence on the electric current boosting circuit 4. In particular, since a region (region A in FIG. 2) from direct current to a low frequency should be used for the operation only of the PWM circuit 2, the direct current signal from the electric current boosting circuit 4 is intercepted.

Further, the resistor 42 plays a roll of promoting charging and discharging by the capacitor 5. If the resistor 42 is not provided, then the impedance when the electric current boosting circuit 4 sucks electric current from the load 6 is high, and therefore, the rise time increases. However, if the resistor 42 is connected, then charging and discharging of displacement current by the capacitor 5 can be promoted and the rise time and the fall time of load current can be reduced.

By the configuration described above, in the region from direct current to a low frequency (region A in FIG. 2: where it is applied to an optical amplifier, approximately several tens kHz), the electric current from the PWM circuit 2 flows to the load 6. In another region (region B in FIG. 2) from a middle band to a high band, composite current from the PWM circuit 2 and the electric current boosting circuit 4 flows to the load 6. In a further region (region C in FIG. 2: approximately 100 to 200 kHz) of high frequencies, electric current from the electric current boosting circuit 4 flows to the load 6.

Figure 5:
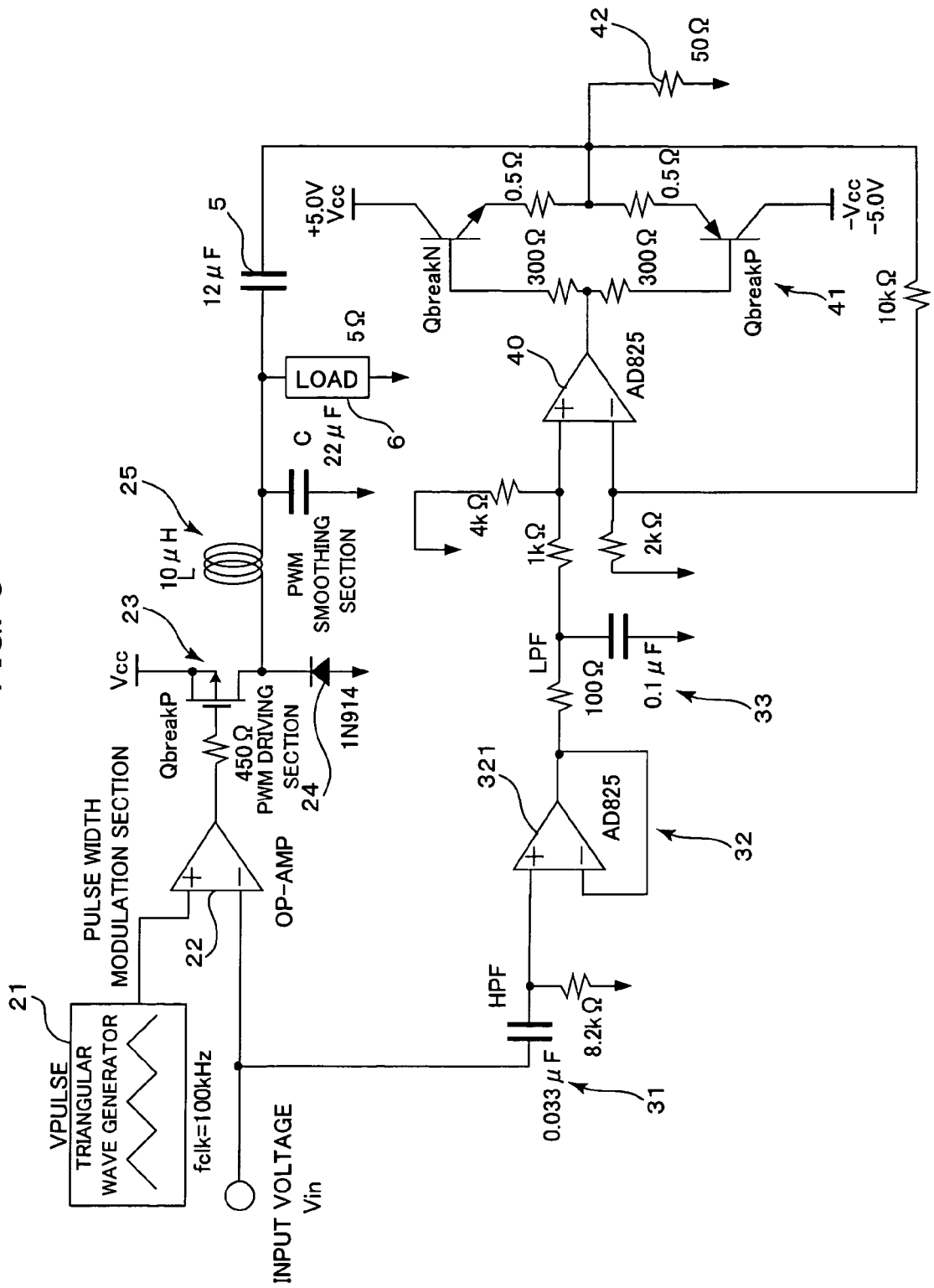
FIG. 5 is a circuit diagram showing an electronic circuit and circuit constants used for simulation of the broadband pulse width modulation circuit shown in FIG. 1.
Figure 6:
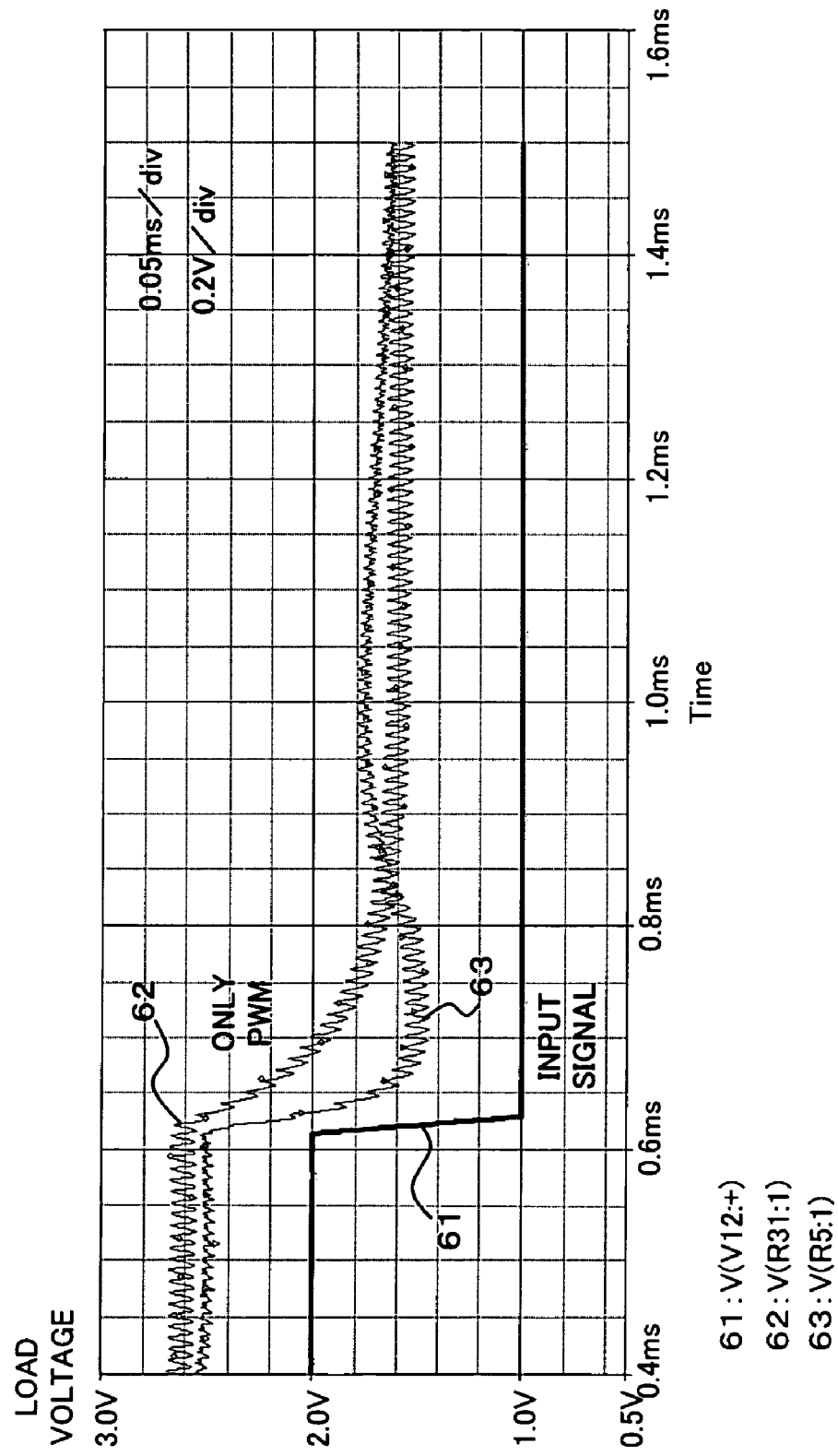
FIG. 6 is a waveform diagram illustrating a result of the simulation of the broadband pulse width modulation circuit shown in FIG. 5.

In order to verify the effect of the broadband PWM circuit 1, the inventor of the present application has performed a simulation using an electronic circuit simulator (PSpice). An electronic circuit diagram and circuit constants used for the simulation are shown in FIG. 5, and a result of the simulation of a transient response is shown in FIG. 6. It is to be noted that solid lines 61, 62 and 63 indicate an input step voltage waveform, a transient response waveform to the input step voltage waveform 61 where only the PWM circuit 2 is used, and a transient response waveform to the input step voltage waveform 61 where the broadband PWM circuit 1 of the present embodiment is used, respectively.

As apparently seen from the result of the simulation, the falling time is as fast as 4 to 5 times at a falling edge portion of the step waveform. It is to be noted that the circuit 1 includes two signal paths to the load 6. Therefore, in order to prevent appearance of an overshoot, an undershoot, ringing and so forth in the transient response waveforms, the frequency characteristics, attenuation characteristics and path gains of the filters 31 and 33 must be finely adjusted and optimized.

[B] Example of Application

Figure 7:
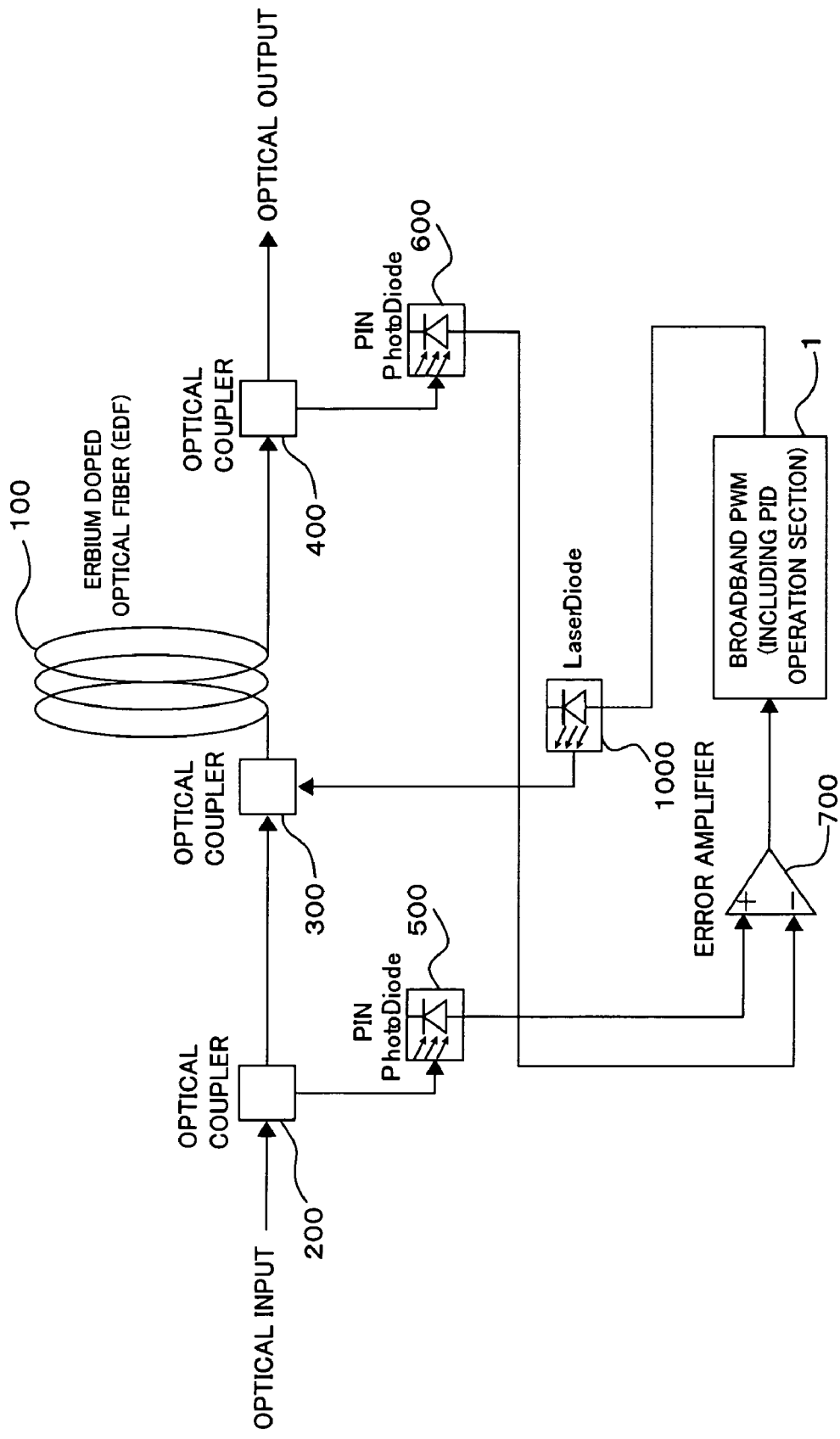
FIG. 7 is a block diagram showing an example of a configuration where the broadband pulse width modulation circuit of the embodiment is applied as an excitation light laser driver of an optical amplifier.

FIG. 7 is a block diagram showing a configuration wherein the broadband PWM circuit 1 described above is applied as an excitation light laser driver. In the configuration of FIG. 7, the broadband PWM circuit 1 of the present embodiment is interposed between the output of the error amplifier 700 and the excitation light laser 1000 described hereinabove with reference to FIG. 8. Consequently, a control section is formed which includes the error amplifier (error detection section) 700 for comparing the outputs of the light reception devices 500 and 600 which individually receive an input light monitor signal and an output light monitor signal from the EDF 100 to detect an input/output level error of the EDF 100 to output an error detection signal and the broadband PWM circuit 1 of the present embodiment having a function as the PID (proportional plus integral plus derivative) controller 800 for securing the stability and speed of response of a control loop for an optical AGC (auto gain control) operation.

In particular, the control section includes the PWM circuit 2 for receiving an output (error detection signal) of the error amplifier 700 as an input voltage signal and modulating and smoothing the pulse width in accordance with the voltage signal to supply driving current to the excitation light laser 1000, the frequency band selection and amplification circuit 3 for selectively amplifying only a specific frequency band from within the error detection signal, the electric current boosting circuit 4 for amplifying output current from the frequency band selection and amplification circuit 3, and the composition circuit 5 for combining the driving current from the PWM circuit 2 and the output current from the electric current boosting circuit 4. It is to be noted that like elements to those of FIG. 8 are denoted by like reference characters.

Consequently, in the optical amplifier shown in FIG. 7, signal light is monitored by the reception light devices 500 and 600 such as PIN photodiodes on the input and output sides of the EDF 100 and the excitation light laser (semiconductor laser) 1000 is controlled so that the optical power gain may be constant. At this time, even if the input or output light level of the EDF 100 varies remarkably, it is possible for the broadband PWM circuit 1 to respond to and follow up the variation of the level at a high speed.

It is to be noted that, where the present configuration and the conventional configuration (refer to FIG. 8) are compared with each other, it can be recognized that the PID controller 800 is not provided in the present configuration. This is because, in the configuration of the circuit 1, since the band characteristic thereof can be adjusted by adjustment of the selection frequency band by the frequency band selection and amplification circuit 3 or the like, even if the PID controller 800 is not provided, the function as the PID (proportional plus integral plus derivative) controller 800 in the optical AGC (auto gain control) operation can be implemented, and consequently, the configuration of the present embodiment can be implemented. Further, also in the present application example, if sufficient electric current (approximately several A) is obtained in the frequency band selection and amplification circuit 3, then the electric current boosting circuit 4 may not be provided.

Further, in the present example, the broadband PWM circuit 1 is applied as an excitation light laser driver of an optical amplifier for which the EDF 100 is used as an amplification medium. Naturally, however, the broadband PWM circuit 1 can be applied also as a driver of an optical amplifier for which a different amplification medium is used. Further, the broadband PWM circuit 1 is applicable not only to an optical amplifier but also for reduction of power consumption where high electric current is necessary as in a component of a different optical communication apparatus such as an electronic cooling device, an electric heater and so forth.

As described hereinabove, with the present embodiment, a circuit can be easily implemented which assures the advantage of the PWM circuit 2 that it has a good power efficiency and which has a desired signal band characteristic and can achieve high speed response. Therefore, particularly in the field of an optical amplifier wherein a demand for reduction of power consumption and a demand for high speed responsibility have been increasing in recent years, the consistency of the demands just described can be achieved.

The present invention is not limited to the embodiment specifically described above, and variations and modifications can be made without departing from the scope of the present invention.

As described in detail hereinabove, with the present invention, only a specific frequency band of an input voltage signal is selectively amplified and electric current of the amplified frequency band and electric current from a pulse width modulation circuit are combined to each other. Therefore, a circuit can be implemented which assures an advantage of pulse width modulation having a good power efficiency and which can achieve high speed responsibility. It is considered that the present invention is very useful particularly to a field of optical communication such as an optical amplifier wherein a demand for reduction of power consumption and a demand for high speed responsibility have been increasing in recent years.

What is claimed is:

1. A broadband pulse width modulation circuit, comprising:
    a pulse width modulation circuit for modulating and smoothing a pulse width in response to an input voltage signal and supplying resulting electric current to a load;
    a frequency band selection and amplification circuit for selectively amplifying only a specific frequency band of the input voltage signal; and
    a composition circuit for combining the electric current from said pulse width modulation circuit and the amplified electric current from said frequency band selection and amplification circuit.

2. The broadband pulse width modulation circuit as claimed in claim 1, wherein the load is a semiconductor laser.

3. The broadband pulse width modulation circuit as claimed in claim 2, wherein said composition circuit is formed from a capacitor which blocks a direct current signal.

4. The broadband pulse width modulation circuit as claimed in claim 3, wherein said frequency band selection and amplification circuit includes:
    a high-pass filter for passing therethrough frequencies of a higher frequency band than a maximum frequency with which a frequency band characteristic of said pulse width modulation circuit degrades;
    an amplifier for amplifying an output of said high-pass filter to perform scale adjustment so that a passing band characteristic of the specific frequency band may become flat; and
    a low-pass filter for passing therethrough only frequency components which form the specific frequency band from within an output of said amplifier.

5. The broadband pulse width modulation circuit as claimed in claim 2, wherein said frequency band selection and amplification circuit includes:
    a high-pass filter for passing therethrough frequencies of a higher frequency band than a maximum frequency with which a frequency band characteristic of said pulse width modulation circuit degrades;
    an amplifier for amplifying an output of said high-pass filter to perform scale adjustment so that a passing band characteristic of the specific frequency band may become flat; and
    a low-pass filter for passing therethrough only frequency components which form the specific frequency band from within an output of said amplifier.

6. The broadband pulse width modulation circuit as claimed in claim 1, wherein said composition circuit is formed from a capacitor which blocks a direct current signal.

7. The broadband pulse width modulation circuit as claimed in claim 6, wherein said frequency band selection and amplification circuit includes:
    a high-pass filter for passing therethrough frequencies of a higher frequency band than a maximum frequency with which a frequency band characteristic of said pulse width modulation circuit degrades;
    an amplifier for amplifying an output of said high-pass filter to perform scale adjustment so that a passing band characteristic of the specific frequency band may become flat; and
    a low-pass filter for passing therethrough only frequency components which form the specific frequency band from within an output of said amplifier.

8. The broadband pulse width modulation circuit as claimed in claim 1, wherein said frequency band selection and amplification circuit includes:
    a high-pass filter for passing therethrough frequencies of a higher frequency band than a maximum frequency with which a frequency band characteristic of said pulse width modulation circuit degrades;
    an amplifier for amplifying an output of said high-pass filter to perform scale adjustment so that a passing band characteristic of the specific frequency band may become flat; and
    a low-pass filter for passing therethrough only frequency components which form the specific frequency band from within an output of said amplifier.

9. A broadband pulse width modulation circuit, comprising:
    a pulse width modulation circuit for modulating and smoothing a pulse width in response to an input voltage signal and supplying resulting electric current to a load;
    a frequency band selection and amplification circuit for selectively amplifying only a specific frequency band of the input voltage signal;
    a current boosting circuit for amplifying output current of said frequency band selection and amplification circuit; and a composition circuit for combining the electric current from said pulse width modulation circuit and the output current from said current boosting circuit.

10. The broadband pulse width modulation circuit as claimed in claim 9, wherein the load is a semiconductor laser.

11. The broadband pulse width modulation circuit as claimed in claim 10, wherein said composition circuit is formed from a capacitor which blocks a direct current signal.

12. The broadband pulse width modulation circuit as claimed in claim 11, wherein said frequency band selection and amplification circuit includes:
   a high-pass filter for passing therethrough frequencies of a higher frequency band than a maximum frequency with which a frequency band characteristic of said pulse width modulation circuit degrades;
   an amplifier for amplifying an output of said high-pass filter to perform scale adjustment so that a passing band characteristic of the specific frequency band may become flat; and
   a low-pass filter for passing therethrough only frequency components which form the specific frequency band from within an output of said amplifier.

13. The broadband pulse width modulation circuit as claimed in claim 10, wherein said frequency band selection and amplification circuit includes:
   a high-pass filter for passing therethrough frequencies of a higher frequency band than a maximum frequency with which a frequency band characteristic of said pulse width modulation circuit degrades;
   an amplifier for amplifying an output of said high-pass filter to perform scale adjustment so that a passing band characteristic of the specific frequency band may become flat; and
   a low-pass filter for passing therethrough only frequency components which form the specific frequency band from within an output of said amplifier.

14. The broadband pulse width modulation circuit as claimed in claim 11, wherein said composition circuit is formed from a capacitor which blocks a direct current signal.

15. The broadband pulse width modulation circuit as claimed in claim 14, wherein said frequency band selection and amplification circuit includes:
   a high-pass filter for passing therethrough frequencies of a higher frequency band than a maximum frequency with which a frequency band characteristic of said pulse width modulation circuit degrades;
   an amplifier for amplifying an output of said high-pass filter to perform scale adjustment so that a passing band characteristic of the specific frequency band may become flat; and
   a low-pass filter for passing therethrough only frequency components which form the specific frequency band from within an output of said amplifier.

16. The broadband pulse width modulation circuit as claimed in claim 11, wherein said frequency band selection and amplification circuit includes:
   a high-pass filter for passing therethrough frequencies of a higher frequency band than a maximum frequency with which a frequency band characteristic of said pulse width modulation circuit degrades;
   an amplifier for amplifying an output of said high-pass filter to perform scale adjustment so that a passing band characteristic of the specific frequency band may become flat; and
   a low-pass filter for passing therethrough only frequency components which form the specific frequency band from within an output of said amplifier.

17. An optical amplifier, comprising:
   a semiconductor laser;
   an optical amplification medium for amplifying an input optical signal using an output of said semiconductor laser as excitation light;
   an error detection section for detecting a level error between an input and an output of said optical amplification medium; and
   a broadband pulse modulation circuit including a pulse width modulation circuit for modulating and smoothing, using an error detection signal from said error detection section as an input voltage signal, a pulse width in response to the input voltage signal and supplying resulting driving current to said semiconductor laser, a frequency band selection and amplification circuit for selectively amplifying only a specific frequency band of the input voltage signal, and a composition circuit for combining the driving current from said pulse width modulation circuit and the amplified electric current from said frequency band selection and amplification circuit.

18. The optical amplifier as claimed in claim 17, wherein said composition circuit is formed from a capacitor which blocks a direct current signal.

19. The optical amplifier as claimed in claim 18, wherein said frequency band selection and amplification circuit includes:
   a high-pass filter for passing therethrough only high frequency components which form the specific frequency band of the input voltage signal;
   an amplifier for amplifying an output of said high-pass filter to perform scale adjustment so that a passing band characteristic of the specific frequency band may become flat; and
   a low-pass filter for passing therethrough only low frequency components which form the specific frequency band from within an output of said amplifier.

20. The optical amplifier as claimed in claim 17, wherein said frequency band selection and amplification circuit includes:
   a high-pass filter for passing only high frequency components which form the specific frequency band of the input voltage signal;
   an amplifier for amplifying an output of said high-pass filter to perform scale adjustment so that a passing band characteristic of the specific frequency band becomes flat; and
   a low-pass filter for passing only low frequency components which form the specific frequency band from within an output of said amplifier.

21. An optical amplifier, comprising:
   a semiconductor laser;
   an optical amplification medium for amplifying an input optical signal using an output of said semiconductor laser as excitation light;
   an error detection section for detecting a level error between an input and an output of said optical amplification medium; and
   a broadband pulse modulation circuit including a pulse width modulation circuit for modulating and smoothing, using an error detection signal from said error detection section as an input voltage signal, a pulse width in response to the input voltage signal and supplying resulting driving current to said semiconductor laser, a frequency band selection and amplification circuit for selectively amplifying only a specific frequency band of the input voltage signal, a current boosting circuit for amplifying output current of said frequency band selection and amplification circuit, and a composition circuit for combining the driving current from said pulse width modulation circuit and the output current from said current boosting circuit.

22. The optical amplifier as claimed in claim 21, wherein said composition circuit is formed from a capacitor which blocks a direct current signal.

23. The optical amplifier as claimed in claim 22, wherein said frequency band selection and amplification circuit includes:

a high-pass filter for passing therethrough only high frequency components which form the specific frequency band of the input voltage signal;

an amplifier for amplifying an output of said high-pass filter to perform scale adjustment so that a passing band characteristic of the specific frequency band may become flat; and a low-pass filter for passing therethrough only low frequency components which form the specific frequency band from within an output of said amplifier.

24. The optical amplifier as claimed in claim 21, wherein said frequency band selection and amplification circuit includes:

a high-pass filter for passing only high frequency components which form the specific frequency band of the input voltage signal;

an amplifier for amplifying an output of said high-pass filter to perform scale adjustment so that a passing band characteristic of the specific frequency band becomes flat; and a low-pass filter for passing only low frequency components which form the specific frequency band from within an output of said amplifier.

* * * * *